Patented May 2, 1950

2,506,294

UNITED STATES PATENT OFFICE 2,506,294

ADRENOCHROME MONO - SEMICARBAZONE COMPOUND AND HAEMOSTATIC COMPOSITION

Georges Dechamps, Liege, Henri Le Bihan, Embourg, and Camille Beaudet, Liege, Belgium, assignors to Societe Belge de l'Azote et des Produits Chimiques du Marly, Liege, Belgium, a corporation of Belgium No Drawing. Application May 21, 1947, Serial No. 749,592. In Belgium November 29, 1943

Section 1, Public Law 690, August 8, 1946
Patent expires November 29, 1963

2 Claims. (Cl. 167—65)

The invention relates to a process for the preparation of a stable haemostatic derivative of adrenochrome and to the products obtained thereby. More particularly, it pertains to the preparation of products which result from reaction between adrenochrome and a salt of a ketone reactive amine derivative as the salts of hydroxylamine, semicarbazide, phenylhydrazine and nitrophenylhydrazines, and includes correlated improvements and discoveries whereby the aforesaid derivatives may be effectively prepared.

It is known that some oxidation products of adrenalin have a pharmacodynamic activity, especially a haemostatic activity similar to that of adrenalin itself or of its derivatives, such as adrenalone. Among these oxidation products, the adrenochrome or N-methyl-3-hydroxy-2,3-dihydro-5.6-quinoneindol is remarkable for its efficiency as a haemostatic agent at very small doses (for instance, about $10^{-6}$ gr. with the rabbit) and for its more rapid and equally intense action than that of adrenalin. Compared to the latter, adrenochrome presents even the advantage that it does not alter the cardiac rhythm and does not cause any hypertension or internal haemorrhages. Thanks to these properties, adrenochrome should be suitable for many therapeutic applications, for instance in surgical operations, in the treatment of internal haemorrhages, etc. Unfortunately its instability, in aqueous or alcoholic solution, makes its use substantially impossible in the medical art.

Adrenochrome decomposes in 35 minutes in an aqueous solution of pH 7.3; in 4 minutes in a 1% acid solution of hydrochloric acid, and in 40 seconds in a 1% ammonia solution. This instability of adrenochrome is principally attributed to the quinone function of the benzene ring of its molecule. Therefore, we have tried to stabilize the quinone function.

Considering adrenochrome as a diketone, we have used, for this purpose, certain ketone reactive reagents, more particularly amine derivatives such as salts of hydroxylamine, semicarbazide, phenylhydrazine and various nitrophenylhydrazines. All these reagents condense easily with adrenochrome and form by reaction with one oxygen atom of the quinone function, the corresponding monoxime, semicarbazone, phenylhydrazone and nitrophenylhydrazones. These condensation products which are much less soluble than adrenochrome and easy to obtain, in pure state, in the form of crystals, are much more stable as to spontaneous transformation and decomposition than adrenochrome itself. Their solutions in water or in other solvents, such as ethanol, even very dilute, are also very stable. Notwithstanding their relatively great chemical inactivity, they retain in a large measure the valuable haemostatic properties of adrenochrome solutions. This important property has been used for therapeutic purpose by us for preparing stable haemostatic solutions which may be kept in ampules.

Clinical experimentation with the various hereinbefore mentioned products has shown that the intensity and the specificity of the haemostatic action differ in a rather unexpected manner from one product to the other.

In the haemostatic medication with the human being, the adrenochrome semicarbazone is particularly suitable. The therapeutic effects of this latter compound are so similar to adrenochrome that it may be considered as a stabilized form of adrenochrome with the therapeutic applications of the latter being thereby made possible.

The practical examples given hereinafter illustrate the application of the invention by means of the adrenochrome semicarbazone, but it is to be understood that the invention is not limited to this particular application. By modifying the method of treatment and the proportions of the reagents used, according to the nature of these reagents, it is possible to prepare, in a similar manner and within the scope of the invention, the corresponding haemostatic agents of adrenochrome monoxime, monophenylhydrazone and mononitrophenylhydrazones.

Example 1

A suspension containing 1 part by weight of adrenalin and 2 to 6 parts by weight of silver oxide in 150 to 250 parts by weight of methanol or ethanol is stirred for about 10 minutes. The alcoholic adrenochrome solution obtained is separated by draining and the filtrate is quickly evaporated to dryness at low temperature and in vacuo. The red crystals of adrenochrome obtained are dissolved in 45 to 55 parts by weight of water. To this solution, 2 parts of sodium acetate dissolved in 2 to 3 parts of water and 2 parts of semicarbazide hydrochloride dissolved in 2 to 3 parts of water are added. The formed precipitate consisting of red-orange prismatic needles is separated by filtration and recrystallized from diluted ethanol. There is obtained 0.30 to 0.40 part by weight of adrenochrome mono-semicarbazone dihydrate, melting at 203° C. with decomposition.

Example 2

10 parts by weight of laevorotatory adrenalin are dissolved in a mixture of 220 parts of pure methanol and 6, 6 parts of formic acid of 85% strength. To this mixture, while heated to 35° C., 40 parts of silver oxide are added under continuous stirring. After one minute's stirring, the liquid is rapidly separated by filtration and maintained at —20° C., for twenty minutes. The crude adrenochrome thus obtained is filtered, washed with 20 parts of methanol at 0° C. and recrystallized at 35–40° C. from a mixture of 39 parts of methanol and 0.48 part of formic acid of 85% strength. After cooling, the crystals are filtered under vacuum. 3.4 gr. of dark-red crystals of pure adrenochrome are thus obtained, which are dissolved in 275 parts of water. To this solution is added a solution of 5.4 parts of semicarbazide hydrochloride and 5.4 parts of sodium acetate, in 34 parts of water. The formed precipitate is filtered under vacuum and recrystallized from diluted ethyl alcohol. 3.7 parts of orange-red adrenochrome mono-semicarbazone dihydrate having a melting point of 203° C., with decomposition, are thus obtained.

Aqueous solutions of the semi-carbazone of adrenochrome even very dilute, are perfectly stable, keep indefinitely in sealed ampules, and may be used for subcutaneous or intramuscular injections. To this end, isotonic solutions are advantageously prepared, adjusted to a pH in the neighborhood of 7 and which may be employed as a preventive or as a curative according to the dose of semi-carbazone administered and according to whether this administration is given before or during a hemorrhage.

In the preventive capacity, that is to say, for the purpose of avoiding or attenuating the hemorrhages normally produced in surgical operations, use is preferably made of solutions of a relatively low concentration, for example, at one ten-thousandth (1:10000), i. e. 100 gammas (0.1 mg.) per cc. A dose of, for example, 1 cc. of a solution of 100 gammas per cc. injected a certain time (for example, ¼ to 1 hour) before an operation, usually bloody, allows of reducing the bleeding in great proportions, and in certain cases even practically suppressing it and/or reducing its duration.

Utilized in a stronger dose, such as one can realize by injection, one or more times, of a larger volume of solution of a low concentration, for example, 100 gammas per cc. (a gamma is a unit of weight equal to the one millionth part of a gram, 0.000,000,353 ounce; Hackh's Chemical Dictionary 1929, page 322), or preferably by the use of more concentrated solutions, of, for example, 500 gammas per cc. or more, the semi-carbazone of adrenochrome is very efficacious also for retarding and arresting hemorrhages in their occurrence. Also, the solutions of semi-carbazone of adrenochrome, which even in strong doses do not show any secondary harmful or toxic action, constitute important progress in the prevention of hemorrhages arising in surgical operations and/or in the treatment of pathological or accidental bleeding.

As illustrative of clinical application; when injected by way of a preventive from 15 to 60 minutes before any surgical operation in a dose of one or more 100-gamma ampules, solutions of the semi-carbazone of adrenochrome have had the effect of reducing greatly the intensity as well as the duration of hemorrhages which would normally be produced, for example, in prostatectomy, tonsillectomy, operations on the nervous system, etc.

By injection as a curative, during hemorrhages, and in a dose of one or more 500-gamma ampules, post-operative bleeding or spontaneous hemorrhages of the digestive tract and of the respiratory organs have furthermore been arrested.

It will be understood that in order to prepare, according to the invention, a stable haemostatic adrenochrome, derivative in the form of mono-semicarbazone, it is not necessary, as in the above described example, to start from a product obtained from adrenalin by means of silver oxide. Adrenochrome, an unstable and intermediate compound between adrenalin and adrenochrome mono-semicarbazone, may be prepared by any other method, for instance, by diastasic oxidation of adrenalin.

What we claim is:

1. As a composition of matter, an adrenochrome semicarbazone.

2. As a composition of matter, a stable injectable haemostatic isotonic aqueous solution containing adrenochrome mono-semicarbazone.

GEORGES DECHAMPS.
HENRI LE BIHAN.
CAMILLE BEAUDET.

REFERENCES CITED

The following references are of record in the file of this patent:

UNITED STATES PATENTS

| Number | Name | Date |
|---|---|---|
| 2,162,863 | Ripke | June 20, 1939 |

OTHER REFERENCES

Deronaux: Archives Internationales de Pharmacodynamie et de Therapie, pages 202–219.

Squibb Abstract Bull., vol. 18 (1945) page 1557.

Veer: Rec. Trav. Chim de Pays Bas, vol. 61 (1942), pages 638 to 646.

Chem. Abstracts 40: 947 (Feb. 20, 1946), citing Compt. Rend. Soc. Biol., vol. 138 (1944), pages 875 to 877